US008238739B1

(12) United States Patent  
Gutierrez

(10) Patent No.: US 8,238,739 B1
(45) Date of Patent: Aug. 7, 2012

(54) STAGE WITH BUILT-IN DAMPING

(75) Inventor: Roman C. Gutierrez, Arcadia, CA (US)

(73) Assignee: Digital Optics Corporation MEMS, Arcadia, CA (US)

( * ) Notice: Subject to any disclaimer, the term of this patent is extended or adjusted under 35 U.S.C. 154(b) by 192 days.

(21) Appl. No.: 12/848,804

(22) Filed: Aug. 2, 2010

Related U.S. Application Data

(63) Continuation of application No. 11/488,411, filed on Jul. 18, 2006, now Pat. No. 7,769,281.

(51) Int. Cl.
G03B 3/10 (2006.01)
G03B 13/34 (2006.01)

(52) U.S. Cl. ........ 396/133; 396/86; 348/357; 310/12.17
(58) Field of Classification Search ............. 396/88, 396/133
See application file for complete search history.

(56) References Cited

U.S. PATENT DOCUMENTS

| | | | |
|---|---|---|---|
| 6,064,129 A * | 5/2000 | Pompei ............ 310/12.01 | |
| 6,687,034 B2 | 2/2004 | Wine et al. | |
| 6,710,950 B2 * | 3/2004 | Rouvinen et al. ........... 359/824 |
| 6,850,675 B1 * | 2/2005 | Calvet et al. .................. 385/52 |
| 7,151,348 B1 * | 12/2006 | Ueda et al. ................... 318/114 |
| 7,697,829 B1 * | 4/2010 | Gutierrez et al. ............... 396/85 |
| 8,090,252 B1 * | 1/2012 | Tang et al. ...................... 396/89 |
| 2005/0057849 A1 | 3/2005 | Twogood et al. |
| 2005/0249487 A1 * | 11/2005 | Gutierrez ........................ 396/85 |
| 2006/0098332 A1 | 5/2006 | Lee et al. |
| 2006/0192885 A1 * | 8/2006 | Calvet et al. ................. 348/345 |
| 2006/0193620 A1 * | 8/2006 | Harrington et al. ............ 396/85 |
| 2007/0035074 A1 * | 2/2007 | Vervoordeldonk et al. ..................... 267/140.11 |
| 2007/0216796 A1 * | 9/2007 | Lenel et al. ................... 348/345 |
| 2011/0317013 A1 * | 12/2011 | Gutierrez et al. ............. 348/143 |

* cited by examiner

Primary Examiner — Clayton E Laballe
Assistant Examiner — Bret Adams
(74) Attorney, Agent, or Firm — Haynes and Boone, LLP

(57) ABSTRACT

A positioning system for a miniature electronic device. The positioning system has a first portion including a damper and a second portion connected to the first portion. The second portion positions a payload of the miniature electronic device. The miniature electronic device may be a miniature camera, or other device.

22 Claims, 3 Drawing Sheets

STAGE WITH BUILT-IN DAMPING

CROSS REFERENCE TO RELATED APPLICATIONS

This patent application is a continuation of U.S. patent application Ser. No. 11/488,411 filed on Jul. 18, 2006 and entitled STAGE WITH BUILT-IN DAMPING, the entire content of which is hereby incorporated explicitly by reference.

BACKGROUND

1. Field of Invention

This invention generally relates to movement in miniature electronic devices.

2. Related Art

Improvements in fabrication processes for small devices (such as MEMS devices) are continuing to reduce minimum device sizes. However, small mechanical and electro-mechanical devices pose a number of challenges. For example, it may be difficult to rapidly and accurately move parts of the devices relative to one another.

One important example of a MEMS device is a miniature camera. Miniature cameras are currently available with many electronic devices, such as cellular telephones, laptop computers, personal digital assistants (PDAs), and the like. Miniature cameras are also available as stand-alone devices for applications such as security and surveillance The market for miniature cameras is rapidly expanding. For example, camera-equipped cell phones were unheard of just a few years ago; now, they are a significant portion of the cell phone market. However, available miniature cameras may not be optimal for some applications.

For example, available miniature cameras may not be optimal because they are fixed focus cameras (i.e., the focus of the cameras is pre-set). By using a relatively small aperture, the depth of field is sufficient to provide acceptable focus over a wide range of distances. However, the provided focus may be unacceptable for some applications. Additionally, the relatively small aperture limits the light used to form the image. This limitation may severely limit the camera's use in low light conditions.

Some miniature cameras use a flash to enhance camera performance in low light conditions. However, the use of a flash consumes more power from the batteries, thus requiring more frequent battery charging.

SUMMARY

In general, in one aspect, a positioning system for a miniature electronic device includes a first portion including a damper and a second portion connected to the first portion, the second portion configured to position a payload of the miniature electronic device. The system may further comprise an actuator in communication with at least one of the first portion and the second portion. The system may further comprise a controller in communication with the actuator, the controller configured to generate an excitation waveform indicative of a desired position of the payload.

The first portion may comprise first stage, and the second portion may comprise a second stage. In some embodiments, the first stage is nested in the second stage. The first portion may comprise a first stage having one or more resonant frequencies, including a first resonant frequency. The second portion may comprise a second stage having one or more resonant frequencies including a second resonant frequency that is substantially the same as the first resonant frequency.

The first portion may comprise a first stage having one or more resonant frequencies including a first resonant frequency, and the second portion may comprise a second stage having one or more resonant frequencies including a second resonant frequency that is different than as the first resonant frequency. One of the second resonant frequency and the first resonant frequency may be an integer multiple of the other of the second resonant frequency and the first resonant frequency. The first portion may be connected to the second portion using one or more flexures. The system may further comprise a frame, and the second portion may be connected to the frame using one or more different flexures.

In general, in another aspect, a mobile electronic device comprises a frame and a positioning system configured to position a moveable portion of the mobile electronic device with respect to the frame. The positioning system may comprise a first portion including a damper and a second portion connected to the first portion using one or more flexures, the second portion configured to position a payload with respect to the frame. The device may further include an actuator in communication with at least one of the first portion and the second portion. The device may comprise a miniature camera. The device may comprise at least one of a personal data assistant, a cell phone, and a security device.

In general, in another aspect, a positioning system for a miniature electronic device may comprise a first positioning means including a means for damping motion of the first positioning means. The system may further comprise a second separate positioning means connected to the first positioning means, the second positioning means configured to position a payload of the miniature electronic device.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques described herein provide improved device performance for small electro-mechanical devices incorporating one or more stage systems. A stage system includes a positioning stage and one or more actuators configured to apply a force (linear force and/or torque) to move the stage from a first position to a second position.

In some existing stage systems, a relatively large force may be applied by the actuator to the stage for a relatively short time, and then quickly reduced to zero. The force may be referred to as a step-function stimulus (although, as with all real physical systems, the applied force is not a pure step function).

Figure 1:
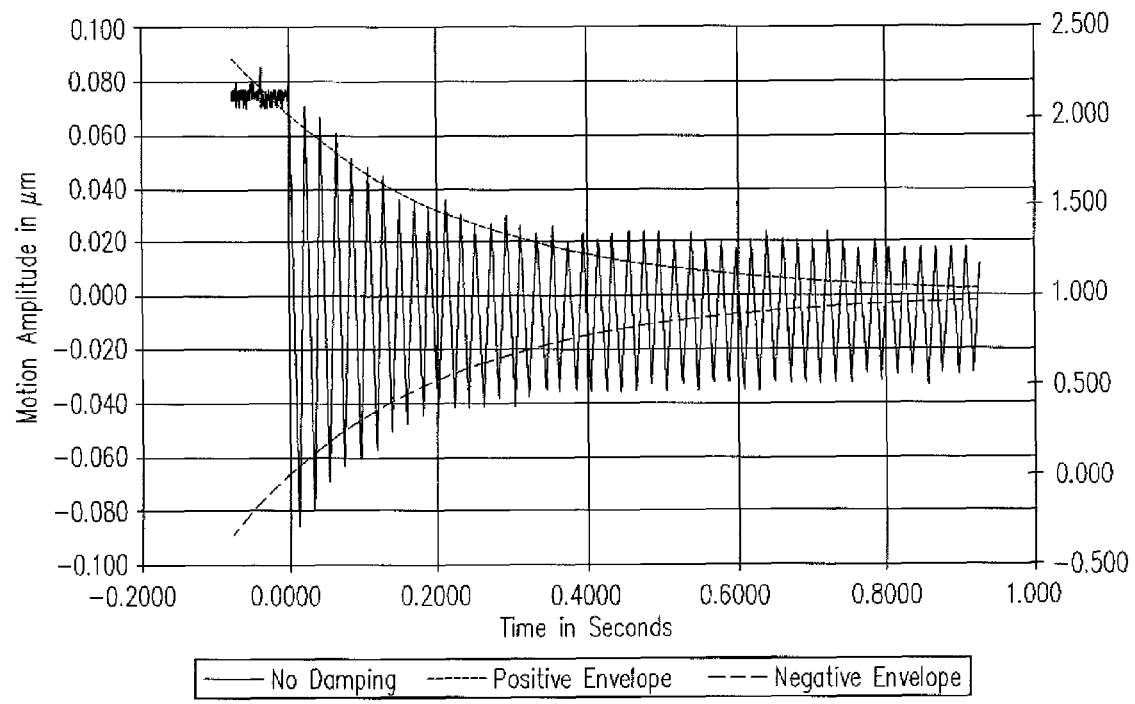
FIG. 1 is a graph of motion amplitude versus time for a positioning system undergoing ringing, according to the prior art.

One problematic effect that may occur with actuator-induced movement of miniature device elements is ringing. Ringing, as discussed in further detail below with reference to FIG. 1, is the undesirable oscillation or vibration of a structure, such as a stage and the optics mounted thereon, that occurs after the structure has been moved rapidly to a new position. Ringing tends to reduce the accuracy of stage positioning (e.g., for focus or zooming in a miniature camera system), and/or undesirably introduce the need for increased settling time.

FIG. 1 illustrates the ringing that occurs in an under-damped system after application of a step-function stimulus. The device under test in FIG. 1 was a SURF80 SiimpelFocus™ Auto Focus module produced by Siimpel Corporation, using MEMS (micro-electro-mechanical systems) technology. The stimulus was provided by a Lorenz actuator. Lorenz actuators comprise a magnetic core and coils, where drive current in the coils linearly actuate the devices. Lorenz actuators for miniature devices are described in, for example, U.S. Pending patent application Ser. No. 11/263,149, entitled LORENZ ACTUATOR FOR MINIATURE CAMERA, which is hereby incorporated by reference in its entirety.

The device exhibits an exponential decaying sinusoidal waveform, typical of an under-damped system. As FIG. 1 illustrates, the oscillation about the desired stage position is significant for times approaching a second. This may be unacceptable for some applications.

The ringing effect may be closely modeled using a second order transfer function such as that shown in Equation (1) below:

$$\frac{Output(s)}{Input(s)} = \frac{\omega_n^2}{s^2 + 2\xi\omega_n s + \omega_n^2} \quad \text{Equation (1)}$$

In Equation (1), $\omega n$ is the natural frequency of the oscillating device, s is the Laplace variable, and $\xi$ is the damping coefficient.

The envelope curves may be modeled using Equation (2) below. The envelope curves represent the rate of decay of the oscillation amplitude over time a(t) as a function of both the damping $\xi$ coefficient and the natural resonant frequency $\omega n$.

$$a(t) = 1 \pm \frac{e^{-\xi\omega_n t}}{\sqrt{1 - \xi^2}} \quad \text{Equation (2)}$$

In some existing systems, ringing is reduced or eliminated using one or more physical damping mechanisms. For example, a viscous material such as oil may be used as a damping mechanism, as described in pending U.S. patent application Ser. No. 11/219,137, filed on Sep. 2, 2005, which is hereby incorporated by reference in its entirety.

In such a system, oil or other material is provided between a stage and a fixed structure with respect to which the stage moves. However, in order to meet performance goals of miniature device systems, controlled amounts of oil may be needed. This may complicate the manufacturing process.

Electronic damping is described in co-pending U.S. patent application Ser. No. 11/485,812, filed on Jul. 12, 2006, entitled Electronic Damping for Stage Positioning, which is hereby incorporated by reference in its entirety. With electronic damping, an excitation waveform for a stage system is configured so that the amplitude of frequency components at one or more resonant frequencies is substantially zero. The waveform may be filtered to remove frequency components, or may be generated so that it does not include particular frequency components Electronic damping has some drawbacks as well. First, small residual oscillations may be difficult to eliminate. Second, electronic damping may not damp external excitation of stage resonances.

Another option is to use different frictional damping techniques; however, these generally introduce hysteresis into the positioning system. Hysteresis is the dependence of the position of a stage on the direction of motion through which the position was obtained. Since hysteresis degrades the positioning accuracy of the system, frictional damping may not be appropriate for some applications.

Systems and techniques herein use a coupled mechanical system to position a payload in an electronic device. A first portion of the mechanical system has an associated damper, and is coupled to a second portion of the mechanical system. The first portion of the mechanical system dissipates energy that would otherwise cause ringing.

Figure 2A:
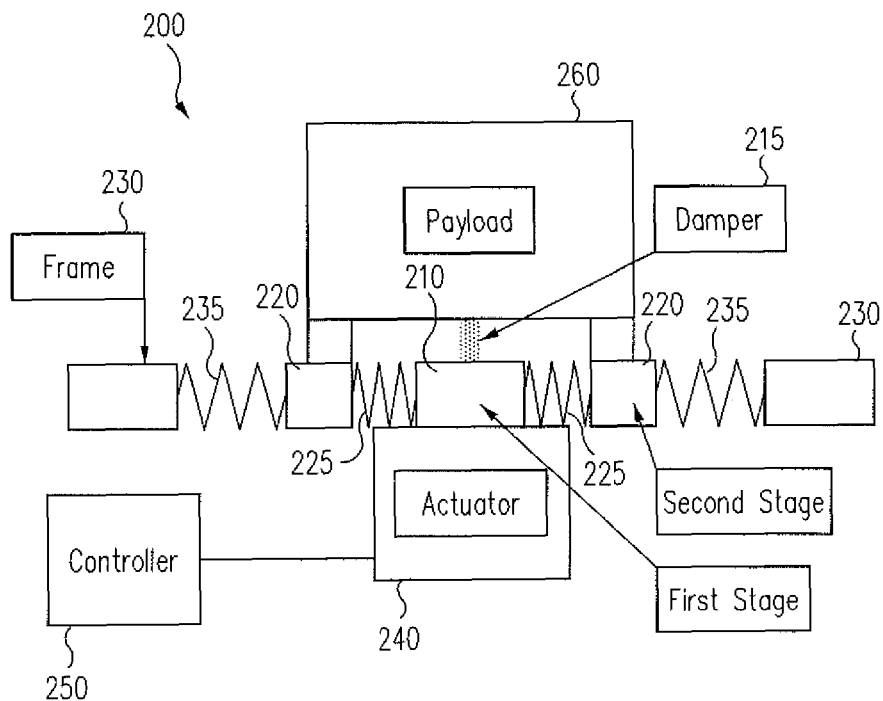
FIGS. 2A and 2B are side and top view of a positioning system, according to some embodiments.
Figure 2B:
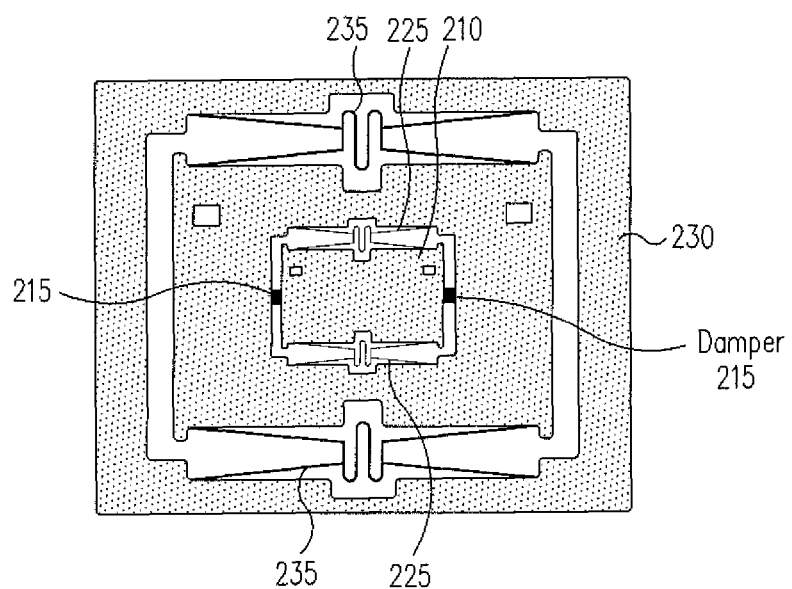

FIG. 2A shows a schematic cross section of a positioning system 200, while FIG. 2B shows a schematic top view of system 200, according to some embodiments. System 200 includes a first portion referred to as first stage 210, which is coupled to a second portion referred to as second stage 220. First stage 210 and second stage 220 are nested; that is, first stage 210 is mounted inside the second stage.

First stage 210 includes a damping mechanism such as a damper 215, which may be (for example) attached to a payload 260 or to first stage 210. Damper 215 may be, for example, a piece of rubber that drags on the first stage. In another example, damper 215 may be a flexible finger incorporated directly on a chip (e.g., a micro-electromechanical system fabricated from silicon). Many other damping mechanisms may be used.

First stage 210 is coupled to second stage 220 with a plurality of flexures 225. Second stage 220 is coupled to a fixed portion of system 200 such as a frame 230 with a different plurality of flexures 235.

In order to position payload 260, a controller 250 may provide a signal indicative of a desired position to an actuator 240. In response, actuator 240 may exert a force on first stage 210. First stage 210 transmits force to second stage 220 via flexures 225.

Flexures 235, which are coupled to frame 230, exert a restoring force on second stage 220. As a result, second stage 220 exerts a positioning force on payload 260 to move payload 260 to the desired position.

Damping first stage 210 and positioning payload 260 using second stage 220 allows frictional damping to be used. Although the movement of first stage 210 may exhibit hysteresis, the positioning of payload 260 remains substantially unaffected.

Since the actuator is force-based, the position of actuator 240 with respect to payload 260 does not affect the positioning results. In other words, actuator 240 exerts a force on first stage 210, but force is transferred directly to second stage 220 through flexures 225 and damper 215. Payload 260 may be positioned as though force is applied directly to second stage 220; however, with the advantage that energy may be dissipated using damper 215, so that ringing is reduced or completely eliminated.

A positioning system such as system 200 may be incorporated into a miniature electronic device employing a system 200 using MEMS technology. The flexures may be designed in the plane of first stage 210 and second stage 220. Additionally, the travel of first stage 210 may be designed to be small enough so that the flexures do not occupy an excessive area of the chip. As noted above, damper 215 may also be incorporated onto a MEMS chip using a flexible finger structure or other damping mechanism.

Figure 3:
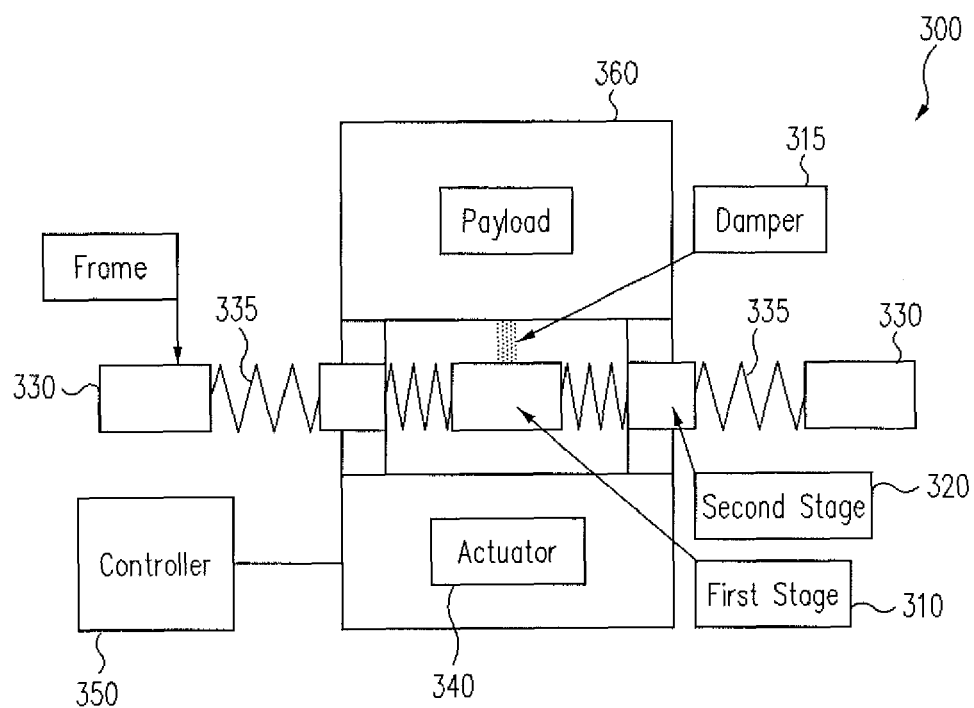
FIG. 3 is a side view of a positioning system, according to some embodiments.

Many other embodiments may be used. FIG. 3 shows a schematic side view of another system 300 that may be used to position a payload 360 in a miniature electronic device.

In the embodiment of FIG. 3, actuator 340 is in communication with second stage 320. First stage 310 may be implemented as simply a mass mounted on springs in communication with a damper 315. First stage 310 removes energy from the system at one or more resonant frequencies of first stage 310. By matching one or more resonant frequencies of first stage 310 with those of second stage 320, ringing of second stage 320 (and thus ringing of payload 360) may be reduced or completely eliminated.

Note that although the resonant frequencies of the first and second stages may be matched, they need not be. They may be multiple frequencies of one another, and may couple energy through non-linearities in the system.

Controller 250 of FIGS. 2A and 2B and controller 350 of FIG. 3 may implement electronic damping, in addition to physical damping of the damping mechanism associated with first stage 210 and first stage 310. As noted above, in electronic damping, the excitation waveform for the actuator(s) is selected to reduce or eliminate ringing. In order to do so, frequency component(s) of the excitation waveform corresponding to one or more resonant frequencies of the mechanical system have an amplitude that is substantially zero. In order to reduce or eliminate the amplitude at those frequencies, the waveform may be filtered, or may be generated in a way that does not generate the un-desired frequency component(s).

Figure 4:
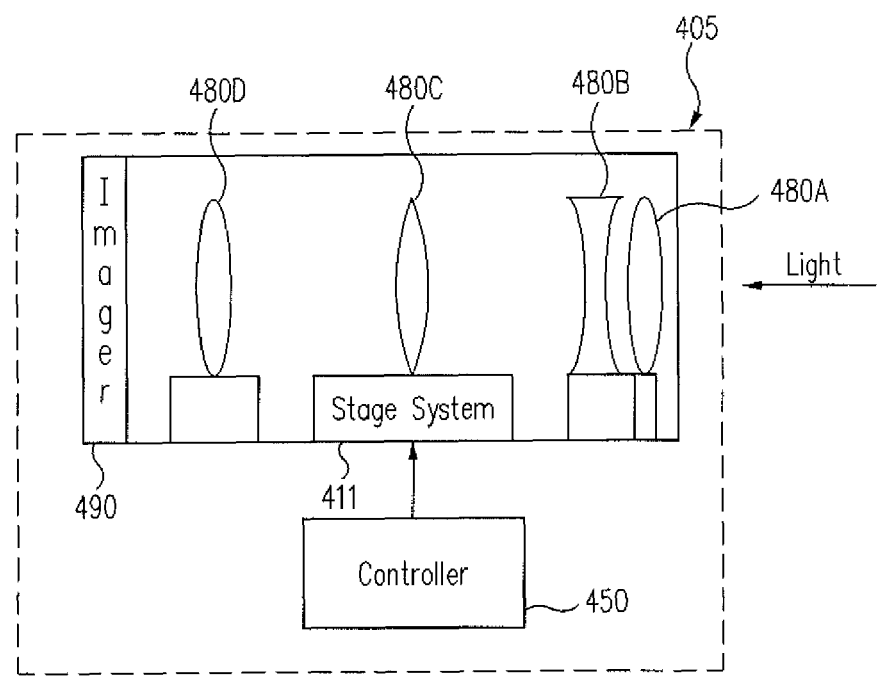
FIG. 4 is a schematic cross sectional diagram of an electronic device including a positioning system such as the systems illustrated in FIGS. 2A, 2B, and 3, according to some embodiments.

Positioning systems such as those illustrated in FIGS. 2A, 2B, and 3 may be used in a wide variety of miniature devices. FIG. 4 shows a block diagram of an exemplary device 405, which includes a miniature camera system.

Device 405 includes a plurality of lenses such as lenses 480A to 480D. Moveable lens 480C is mounted on a stage system 411, while fixed lenses 480A, 480B, and 480D are mounted to a fixed portion of device 405. Stage system 411 includes first and second portions, where the first portion is in communication with a damping mechanism to damp ringing, and where the second portion is configured to move lens 480C (the payload). The first and second portions may be, for example, first and second stages such as those shown in FIGS. 2A, 2B, and 3.

In the illustrated embodiment, the miniature camera may provide auto-focus, zoom, image stabilization, and/or other functionality in which one or more lenses are moved in one or more directions. Controller 450 may provide a signal to stage system 411 indicative of a desired position. As noted above, in some implementations, the signal may be indicative of an excitation waveform for an actuator that does not include particular frequency components (to implement electronic damping).

The actuator exerts a force on at least one of the first and second portions of stage system 411. The damping mechanism of the first portion damps oscillations so that ringing of the second portion (and thus the payload) is reduced or eliminated.

Miniature camera systems may be used in fixed or mobile devices, which may have only camera functionality or may be multi-function device.

One well-known example is the cell phone. Providing improved positioning capability in a cell phone camera may allow for better images using auto-focus, zoom, image stability, or the like. Miniature cameras may also be provided in other mobile devices, such as personal digital assistants (PDAs).

In another example, a miniature camera system may be provided in a fixed security system. Features such as auto-focus and zoom may be beneficial in improving the images obtained in such a system.

Alternately, a miniature camera system may be provided in a mobile security system. For example, the miniature camera may be camouflaged as a household item such as a clock that may be easily moved from location to location.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A system for positioning a payload within a miniature electronic device, comprising:
   a generally planar first stage having a damper coupled thereto for damping movement of the first stage;
   a generally planar second stage coupled to the payload and having an opening therein;
   a generally planar support frame having an opening therein, the second stage being supported within the opening of and generally coplanar with the support frame;
   an actuator coupled to at least one of the first and second stages; and,
   a controller in communication with the actuator, the controller being configured to generate an excitation waveform corresponding to a desired position of the payload within the electronic device.

2. The system of claim 1, further comprising an actuator in communication with at least one of the first stage and the second stage.

3. The system of claim 2, further comprising a controller in communication with the actuator, the controller configured to generate the excitation waveform corresponding to the desired position of the payload.

4. The system of claim 1, wherein the first stage is nested in the second stage.

5. The system of claim 1, wherein the first stage has at least one resonant frequency including a first resonant frequency and wherein the second stage has at least one resonant frequency including a second resonant frequency that is substantially the same as the first resonant frequency.

6. The system of claim 1, wherein the first stage has at least one resonant frequency including a first resonant frequency and wherein the second stage has at least one resonant frequency including a second resonant frequency that is different from the first resonant frequency.

7. The system of claim 6, wherein one of the second resonant frequency and the first resonant frequency is an integer multiple of the other of the second resonant frequency and the first resonant frequency.

8. The system of claim 1, wherein the first stage is connected to the second stage using one or more flexures.

9. The system of claim 8, further comprising a frame, and wherein the second stage is connected to the frame using at least one flexure.

10. A mobile electronic device comprising:
a support frame having an opening therein; and,
a positioning system configured to position a moveable portion of the mobile electronic device to a selected position with respect to the support frame, the positioning system comprising:
a first stage having a damper coupled thereto for damping movement of the first stage; and,
a second stage coupled to the moveable portion of the device and having an opening therein, the second stage being supported within the opening of the support frame by a second plurality of flexures.

11. The device of claim 10, further comprising an actuator in communication with at least one of the first stage and the second stage.

12. The device of claim 11, further comprising a controller in communication with the actuator, the controller configured to generate an excitation waveform indicative of a desired position of the movable portion with respect to the frame.

13. The device of claim 10, wherein the first stage is nested in the second stage.

14. The device of claim 10, wherein the first stage has at least one resonant frequency including a first resonant frequency and wherein the second stage has at least one resonant frequency including a second resonant frequency that is substantially the same as the first resonant frequency.

15. The device of claim 10, wherein the first stage has at least one resonant frequency including a first resonant frequency and wherein the second stage has at least one resonant frequency including a second resonant frequency that is different from the first resonant frequency.

16. The device of claim 15, wherein one of the second resonant frequency and the first resonant frequency is an integer multiple of the other of the second resonant frequency and the first resonant frequency.

17. The device of claim 10, wherein the device comprises a miniature camera.

18. The device of claim 10, wherein the device comprises at least one of a personal data assistant, a cell phone, and a security device.

19. A positioning system for a miniature camera comprising:
a first positioning means including a means for damping motion of the first positioning means; and
a second separate positioning means connected to the first positioning means, the second positioning means configured to position a movable portion of the miniature camera.

20. The system of claim 19, further comprising an actuating means for applying force to at least one of the first positioning means and the second positioning means.

21. The system of claim 20, further comprising a controlling means in communication with the actuating means, the controlling means for generating an excitation waveform corresponding to a of a desired position of the movable portion for controlling the actuating means.

22. The system of claim 19, further comprising means for flexibly connecting the first positioning means to the second positioning means.

* * * * *

UNITED STATES PATENT AND TRADEMARK OFFICE
CERTIFICATE OF CORRECTION

PATENT NO. : 8,238,739 B1
APPLICATION NO. : 12/848804
DATED : August 7, 2012
INVENTOR(S) : Roman C. Gutierrez Page 1 of 1

It is certified that error appears in the above-identified patent and that said Letters Patent is hereby corrected as shown below:

ON THE TITLE PAGE:

Item (73) Assignee:

Change "Digital Optics Corporation MEMS" to -- "DigitalOptics Corporation MEMS" --

IN THE SPECIFICATIONS:

In column 3, line 40:

Change the word "con" to the symbol -- "ωn" --

Signed and Sealed this
Nineteenth Day of March, 2013

Teresa Stanek Rea
*Acting Director of the United States Patent and Trademark Office*